Feb. 21, 1933.  W. H. NOELTING  1,898,309
CUSHION ROCKING SLIDE
Filed May 24, 1930
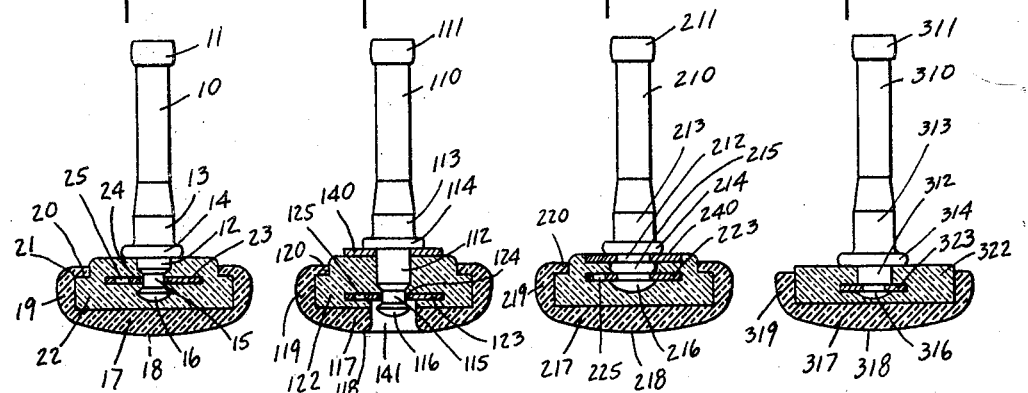
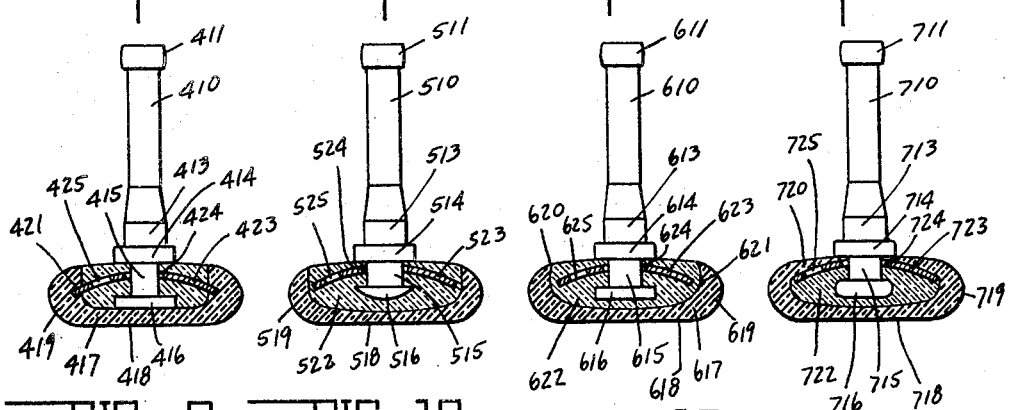
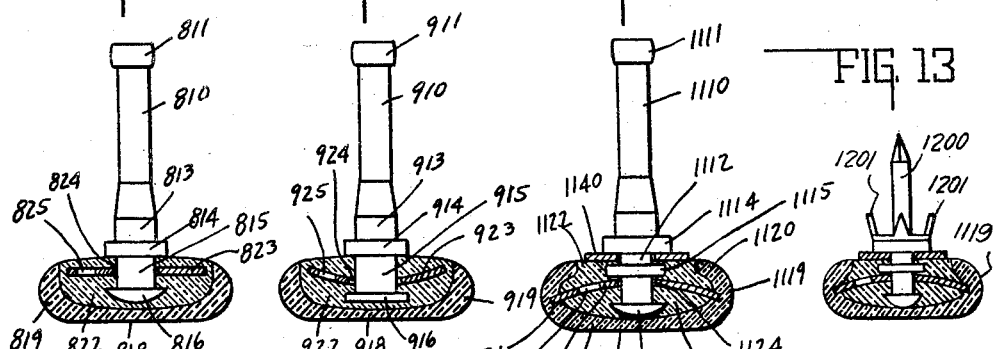
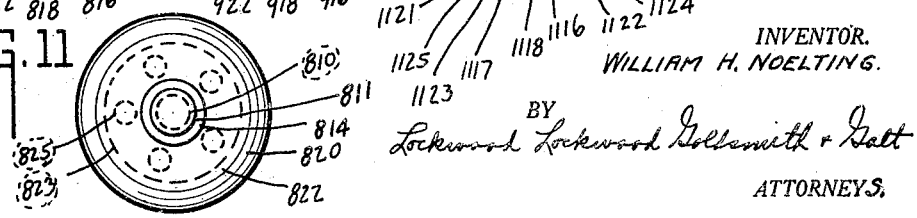
INVENTOR.
WILLIAM H. NOELTING.
BY
Lockwood Lockwood Goldsmith & Galt
ATTORNEYS.

Patented Feb. 21, 1933

1,898,309

UNITED STATES PATENT OFFICE

WILLIAM H. NOELTING, OF EVANSVILLE, INDIANA, ASSIGNOR TO FAULTLESS CASTER COMPANY, OF EVANSVILLE, INDIANA, A CORPORATION

CUSHION ROCKING SLIDE

Application filed May 24, 1930. Serial No. 455,182.

This invention relates to a rocking cushion slide.

The chief object of this invention is to provide a slide of non-marring characteristics with a connection between the slide portion and the stem portion, such that the stem and slide may have relative rocking movement and which will permit the automatic return of the parts to the normal position when the cocking or eccentric force is removed therefrom, such eccentric force being normally positionable when a straight leg chair is tilted.

Another object of the invention is the arrangement of several parts such that universal tilting is possible.

The chief feature of the invention consists in the accomplishment of the foregoing objects by the formation of a surface engaging member of substantially hard rubber so that it will have a non-marring surface and will also have sufficient strength and the universal mounting of the stem in a central chamber formed in the hard rubber portion, said mounting being obtained through the instrumentality of a softer and cushion rubber portion which substantially fills the central chamber of the hard rubber body.

To obtain proper distribution of stress in the soft rubber filling, the anchorage for the stem includes an imbedded washer or plate to which the stem is permanently connected.

The full nature of the invention will be understood from the accompanying drawing and the following description and claims:

In the drawing Fig. 1 is a central sectional view of one embodiment of the invention.

Fig. 2 is a similar view of a second embodiment.

Fig. 3 is a similar view of a third embodiment.

Fig. 4 is a similar view of a fourth embodiment.

Fig. 5 is a similar view of a fifth embodiment.

Fig. 6 is a similar view of a sixth embodiment.

Fig. 7 is a similar view of a seventh embodiment.

Fig. 8 is a similar view of an eighth embodiment.

Fig. 9 is a similar view of a ninth embodiment.

Fig. 10 is a similar view of a tenth embodiment.

Fig. 11 is a top plan view of the form shown in Fig. 9.

Fig. 12 is a central sectional view of another modification and the modification upon which all of the claims read.

Fig. 13 is a similar view of another modification.

In Fig. 1 of the drawing, 13 indicates the stem of a rocking cushion slide, said stem terminating in the head portion 11 and including therebetween a reduced neck portion 10 for socket retention. The stem is laterally enlarged at 14 and projecting therefrom, oppositely from the head, is the body portion 12 which is reduced as at 15 and then enlarged as at 16 at the end.

A substantially hard rubber or rubber like slide body or base 17 has a rounded periphery and circumferentially thereof, and projecting upwardly is the side wall portion 19. As shown in Fig. 1 the same terminates in an inwardly extending flange portion 20 which provides a central chamber having a groove 21. Positioned within the chamber is a plate 23 which is centrally apertured as at 24 to receive the reduced portion 15 of the stem. The aperture 24 in the present instance is slightly larger than the stem and the stem where it is enlarged as at 16 and at 12 form said reduced portion 15, is flared so that the stem may rock relative to the plate for a limited amount. The chamber is filled with a soft rubber composition such as rubber sponge 22 and the same is exposed through the central opening in the shell of hard rubber having the base portion 17, the peripheral wall 19, the inturned flange 20 and the bottom slide surface 18. In the present invention, the washer 23 is provided with a plurality of apertures 25 so that the soft rubber composition extends therethrough and the soft rubber, chamber filling, body is interlockingly associated with the washer.

The slide when mounted in a standard caster socket has its flange portion 14 engaging the open end of the socket and the friction clips, or other anchoring means of said socket, engage the stem portion 10 so that dropping out of the slide is prevented by the socket stem retaining means engaging the head portion 11 of the stem.

In each of the Figs. 2 to 10 inclusive, there is illustrated a different modification of the invention and in said figures similar or like parts are indicated by similar numerals of the (N−1) times 100 plus X series, where "N" is the number of the figure and "X" is the numeral of the corresponding part in the embodiment of the invention shown in Fig. 1.

In Fig. 2 the embodiment is shown provided with an additional top exposed washer 140 and the bottom portion 117 is recessed as at 141 to expose the enlarged end 116 of the stem and a portion of the plate 123.

In Fig. 3 the plate 223 is rigidly supported by the end of the stem and in this form of the invention the portion 215 constitutes an enlargement which co-operates with the enlargement 216 to rigidly anchor the imbedded plate 223 to the stem.

The enlargement 215 co-operates with the enlargement 214 to rigidly anchor the exposed plate 240, the intermediate portion 212 thereof extending through said plate.

In the modification shown in Fig. 4 the chamber is of the non-groove and open chamber type and the washer 323 is not apertured and is rigidly carried by the end of the stem and is imbedded in the soft rubber chamber filling body portion 322.

In Fig. 5 the modification includes the groove 421 which is pitched upwardly and seated therein is the apertured plate or washer 423 which is loosely mounted as at 424 upon the reduced portion 415 of the stem. The latter terminates in the enlargement 416 which bears upon the bottom of the chamber formed by the inner wall of the harder rubber body 417. The plate is dished upwardly and includes the apertures 425.

In Fig. 6 a modified form of the aforesaid is illustrated and in this form the washer 523 is not seated in any side wall or groove of the chamber but rides free and in this respect is similar to the washers shown in the modifications illustrated in Figs. 1 to 4 inclusive. This form of the invention also omits the groove in the chamber side wall. In this form of the invention plate 523 rides loosely upon the reduced portion 515 of the stem and is prevented from separation by the enlargement 516 which has a curved bottom for distributing the thrust.

In Fig. 7 a similar form of the invention is illustrated but in this instance, the chamber side wall instead of being substantially cylindrical, curves inwardly at the mouth of the opening and forms an inwardly projecting flange 620, providing an annular portion 621 of slight groove conformation. The washer 623 rides free upon the reduced portion 615 of the stem and the enlargement 616 at the end thereof, instead of having a curved end conformation, is flat as shown in Fig. 5.

In the modified form of the invention illustrated in Fig. 8 the washer 723 is enclosed within the chamber and the inwardly projecting flange 720 extends almost to the stem and thus forms almost a complete covering for the softer rubber body 722. The washer 723 rides loosely upon the portion 715 and the enlargement 716, at the end of the stem, prevents separation and in this form of the invention, the end of the stem rides free from the bottom of the chamber, as likewise illustrated in Figs. 1, 3, 4, 6 and 7.

In Fig. 9 the chamber is illustrated as of the character shown in Fig. 6. In other words, the groove is eliminated and the only difference in this form of the invention from that shown in Fig. 6 is that the plate 823 is not arched or curved as is illustrated in Figs. 5 to 8 inclusive.

In Fig. 10 a modified form of the invention is illustrated and in this form of the invention the stem rides free of the bottom, as shown in all of the figures, except Figs. 2, 5, 12 and 13 and the end of the stem 916 is similar in character to that shown in Figs. 5 and 7 and the chamber is similar to that shown in Figs. 6 and 9, that is there is no groove provided.

The chief difference between the modifications shown in Figs. 6 and 10 is that the imbedded ends of the stem are different and in Fig. 10 the plate 923 is dished upwardly instead of downwardly, as shown in Figs. 6, the plate riding free from the side wall.

The differences between Figs. 7 and 10 are that Fig. 7 includes a slightly inwardly directed flange 620 while the chamber in Fig. 10 does not and the plate 623 is arched or dished downwardly while in Fig. 10 plate 923 is arched or dished upwardly.

It will be apparent from the foregoing that various modifications of the invention illustrated in the drawing and described hereinbefore, may be made without departing from the broader features thereof and the various features specifically illustrated and enumerated may be combined as illustrated without departing from the broad idea of the invention and such features may be briefly enumerated as follows:

A relatively hard rubber non-marring cover having a relatively flattened but curved, surface engaging, contour and including an upwardly opening central chamber, the opening, if desired, being provided with an inwardly directed flange; a relatively soft rubber central body or a core completely filling said chamber and in all instances (except Fig. 8) being exposed through the opening before mentioned and imbedding a washer or plate (except Fig. 8) which is centrally apertured and mounted on the lower end of a supporting stem and generally riding loosely thereon (except Figs. 3 and 4), which plate may be apertured (except as noted in Fig. 4), said plate being permanently mounted on said stem, the enlargement thereof riding free from the hard rubber body (except Figs. 5, 12 and 13), and said stem having a socket engageable enlargement which bears upon the soft rubber core directly as in Figs. 1 and 4 to 7 inclusive and 9 and 10, or indirectly as shown in Figs. 2, 3 and 8, in the latter instance bearing upon the hard rubber extended flange and in the two former bearing upon an auxiliary washer and in this respect the additional and exposed washer of Figs. 2 and 3 is the equivalent of the extremely extended flange 720 of Fig. 8.

In Fig. 12 there is illustrated an embodiment of the invention upon which all of the claims read. This form of the invention includes the imbedded plate 1123, the periphery of which is received by groove 1121 in the side wall of the chamber formed by the side wall 1119 and bottom 1117 of the hard composition portion, said side wall having the inturned flange 1120 for retaining the softer composition 1122 within the chamber. The plate 1123 is centrally apertured at 1124 and the stem is enlarged at 1116 therebeneath and in this instance, bears upon the bottom of the chamber. Permanent separation of the stem and plate is prevented by the portion 1115, which also co-operates with the enlarged portion 1114, mounted upon the intermediate portion 1112 of said stem and second auxiliary exposed load distributing plate 1140.

In Fig. 11 the arrangement of the apertures 825 is clearly illustrated. It will be apparent that this arrangement or any other suitable arrangement may be embodied in the various forms of the invention and one of said apertures when utilized is indicated by the number 25 in Fig. 1; 125 in Fig. 2; 225 in Fig. 3; 425 in Fig. 5; 525 in Fig. 6; 625 in Fig. 7; 725 in Fig. 8; 825 in Fig. 9; 925 in Fig. 10 and 1125 in Fig. 12.

While the terminology stem has been employed throughout the description and in all the figures has been illustrated as an elongated member capable of detachable mounting upon a furniture leg, it is to be understood that said stem may be permanently attached thereto. Likewise, the stem may be modified and formed as a central prong or barb 1200 or a peripheral series of barbs 1201 may be embodied or both as shown in Fig. 13.

The terminology "stem" employed in the claims is intended to include the aforesaid modifications, see Fig. 12, upon which form all the claims read.

The invention claimed is:—

1. A rocking cushion slide including a relatively hard composition load sustaining shell having a bottom and a side wall forming a chamber with a central upwardly directed opening, a stem having a portion extending downwardly through the central opening and into the chamber, a softer cushioning composition within and substantially filling said chamber, and a load distributing plate carried by the chamber included portion of the stem and associated with the softer cushioning composition for distributing the load, said stem having universal possible rocking movement relative to the bottom, said side wall of the chamber having a groove therein and the plate having its outer peripheral edge seatable in said groove, said plate being apertured for lockingly associating all portions of the softer composition with said plate.

2. A rocking cushion slide including a relatively hard composition load sustaining shell having a bottom and a side wall forming a chamber with a central upwardly directed opening, a stem having a portion extending downwardly through the central opening and into the chamber, a softer cushioning composition within and substantially filling said chamber, and a load distributing plate carried by the chamber included portion of the stem and associated with the softer cushioning composition for distributing the load, said stem having universal possible rocking movement relative to the bottom, said chamber included portion of the stem terminating in a lateral enlargement within said chamber and bearing upon the bottom of the chamber.

In witness whereof, I have hereunto affixed my signature.

WILLIAM H. NOELTING.